(12) United States Patent
Barthelemy et al.

(10) Patent No.: US 8,290,711 B2
(45) Date of Patent: Oct. 16, 2012

(54) METHOD OF ESTIMATING THE FRACTURE DENSITY IN A ROCK MEDIUM

(75) Inventors: Jean-François Barthelemy, Saint-Mandé (FR); Martin Guiton, Versailles (FR); Jean-Marc Daniel, Chatou (FR)

(73) Assignee: IFP, Cedex (FR)

( * ) Notice: Subject to any disclaimer, the term of this patent is extended or adjusted under 35 U.S.C. 154(b) by 409 days.

(21) Appl. No.: 12/408,255

(22) Filed: Mar. 20, 2009

(65) Prior Publication Data

US 2009/0235729 A1 Sep. 24, 2009

(30) Foreign Application Priority Data

Mar. 21, 2008 (FR) ...................................... 08 01588

(51) Int. Cl.
*G01V 1/40* (2006.01)
*G01V 9/00* (2006.01)
*G01V 1/00* (2006.01)
*E21B 47/026* (2006.01)
*E21B 49/00* (2006.01)

(52) U.S. Cl. ........... 702/6; 702/2; 702/5; 702/9; 702/10; 702/11; 175/50; 367/25

(58) Field of Classification Search .................. 702/2, 5, 702/6, 9, 10, 11; 175/50; 367/25
See application file for complete search history.

(56) References Cited

U.S. PATENT DOCUMENTS

| | | | |
|---|---|---|---|
| 6,094,619 A * | 7/2000 | Noetinger et al. | 702/12 |
| 6,266,618 B1 | 7/2001 | Ye et al. | |
| 2008/0062814 A1 | 3/2008 | Prioul et al. | |

OTHER PUBLICATIONS

Garcia et al., "Fast and Efficient Modeling and Conditioning of Naturally Fractured Reservoir Models Using Static and Dynamic Data," Jun. 2007, Society of Petroleum Engineers, SPE 107525.*
Fitzgerald, E. M., et al: Fracture-Frequency Prediction from Borehole Wireline Logs using Artificial Neural Networks:, Geophysical Prospecting, Nov. 1999, Blackwell Publishing Ltd., G.B., vol. 47, No. 6, Nov. 1999, pp. 1031-1044, XP002513477.
Terzaghi, R.D., "Sources of Error in Joint Surveys". Géotechnique, 15: 287-304.
Mauldon, M. et al "Fracture Sampling on a Cylinder: From Scanlines to Boreholes and Tunnels". Rock Mech. Roc, Engng. 30(3): 129-144, 1997.
Narr, W. "Estimating Average Fracture Spacing in Subsurface Rock," AAPG Bulletin, 90, 10 1565-1586, 1996.
Starzec, P. et al: "Use of Fracture-Intersection Density for Predicting the Volume of Unstable Blocks in Underground Openings", International Journal of Rock Mechanics & Mining Sciences, 39: 807-813, 2002.

* cited by examiner

*Primary Examiner* — Janet Suglo
(74) *Attorney, Agent, or Firm* — Antonelli, Terry, Stout & Kraus, LLP.

(57) ABSTRACT

The invention is a method of constructing a three-dimensional fracture density log of a porous formation traversed by fractures and a borehole. A number N of intersections between the fractures and the borehole is measured over a section of the borehole of length L located at a depth d, from observations of the wall of this section. A conditional probability law of the three-dimensional fracture density is then estimated, knowing the number N of intersections. The value of the three-dimensional fracture density at depth d is determined by calculating the mean of this conditional probability law. Finally, the three-dimensional fracture density log is constructed by repeating the previous stages for different depths. A three-dimensional fracture density uncertainty log can also be associated by calculating quantiles of the conditional probability law.

21 Claims, 7 Drawing Sheets

METHOD OF ESTIMATING THE FRACTURE DENSITY IN A ROCK MEDIUM

BACKGROUND OF THE INVENTION

1. Field of the Invention

The present invention relates to the field of characterization of fractured porous media, that is media where the presence of fractures plays an important part in the physical properties of the medium. In particular, the invention relates to a method of constructing a fracture density log (FIG. 2) of a porous formation traversed by a series of fractures and at least one borehole.

2. Description of the Prior Art

Fractures contribute to reducing the resistance capacities of the rock and they can significantly increase the ease of circulation of the fluid (mean permeability) in relation to the properties of the sound rock. In most cases, studying these media requires information on the density of the fractures contained therein. For example, knowledge of the 3D fracture density in a rock is crucial in the field of civil engineering in order to predict the behavior of the rock during the construction of a piece of work such as a tunnel. This density is also fundamental for estimating the mean hydrodynamic properties of rocks affected by a fracture network. As a complement to the orientation and length distribution, the fracture density directly influences the fracture connectivity. In the case of petroleum exploration and production, the fracture density defines the size of the sound matrix blocks containing the oil in place, and it controls the connection between these blocks and a producer well (or an injector well in the case of enhanced recovery or $CO_2$ sequestration). Knowledge of the fracture network is also important information in the field of hydrogeology for aquifer characterization.

The understanding and even the prediction of flows in fractured reservoirs is the subject of numerical models at the reservoir scale or in the vicinity of the wells. In order to perform simulations by means of softwares referred to as flow simulators, it is necessary to construct:

- a structural model with the geometries of the rock layers and of the large faults that carve them;
- a lithologic model generally constructed by means of geostatistical tools or from numerical sediment transport simulations, by assigning to each lithology properties relative to the flows;
- in the case of fractured reservoirs, a model of the distribution and of the properties of the fractures within an elementary volume representative of the reservoir.

The statistical properties of the fractures and the flow properties of a homogeneous elementary volume equivalent to the fractured rocks volume are the input parameters of the flow models in reservoirs.

Characterization of the fractures in terms of orientation, density and hydrodynamic properties is essential for modelling flows in reservoirs. Reservoir formations cover several tens of kilometers laterally and are located at depths of the order of one hundred meters for aquifers, and generally several kilometers for hydrocarbon reservoirs. The only fracture observation data available come from the wells (coring or imaging). More precisely, these data relate to the intersection of the fractures with the well walls and they therefore only allow sparse reservoir sampling.

In order to estimate the density, a first approach counts the number of fractures per well length unit, denoted by density $P_{10}$. According to a known measurement bias, there is little chance that the fractures that are more or less parallel to the wells will intercept it in comparison with those that are greatly oblique thereto. This bias is then corrected by weighting each fracture intersection by a function that decreases with the obliquity of the fractures in relation to the well ("Terzaghi R. D., Sources of Error in Joint Surveys. Géotechnique, 15: 287-304"). One major drawback of this method is that it does not take into account the influence of the length distribution on the correction factor, which plays an important part when the size of the fractures is comparable to or smaller than the radius of the well, and their intersection with the well wall is frequently expressed by partial traces (fracture that does not completely intersect the cross section of the well) ("Mauldon, M. and Mauldon, J. G. Fracture Sampling on a Cylinder. From Scanlines to Boreholes and Tunnels. Rock Mech. Rock Engng. 30(3): 129-144, 1997").

A second approach estimates the three-dimensional density, denoted by density $P_{32}$, within a well core interval, while considering it to be representative of density $P_{32}$ in a reservoir volume. In an equivalent manner ("Narr W. Estimating Average Fracture Spacing in Subsurface Rock, AAPG Bulletin, 90, 10: 1565-1586, 1996"), by proposing constant opening of the fractures, a ratio is calculated between the volume of a core interval and the sum of the volumes within the fractures, and this ratio is assumed to be equal to its measurement in a reservoir volume.

A third method consists in:

1—generating discrete fracture network models by varying density $P_{32}$ for given orientation and length laws;

2—calculating the intersection of these models with the well interval so as to obtain the corresponding densities $P_{10}$; and 3—seeking, from the cluster of points $(P_{10}, P_{32})$ obtained, the linear regression curve that best satisfies (in the sense of the least squares) the relation between $P_{32}$ and $P_{10}$.

This linear relation is then used to provide a value for $P_{32}$ for each observation of $P_{10}$. This method, unlike the previous ones, is akin to a Monte-Carlo method and it involves the drawback of a long calculating time. However, by using networks generated by means of statistical laws provided by the user, it takes implicitly into account the biases due to the orientation and length distributions. It has notably been applied (in "Starzec P. and C-F Tsang. Use of Fracture-Intersection Density for Predicting the Volume of Unstable Blocks in Underground Openings", International Journal of Rock Mechanics & Mining Sciences, 39: 807-813, 2002") to establish on the one hand a relation between density $P_{32}$ and density $P_{10}$ and, on the other hand, a relation between density $P_{32}$ and the number of fractures that have an intersection with a plane surface.

Because of the sparse reservoir sampling by the measurement intervals on the well, the uncertainty on the possible value of $P_{32}$ knowing $P_{10}$ can be large (see FIG. 5). Now, the three methodologies presented above only provide an estimation of a mean density $P_{32}$ for each observation of $P_{10}$ and they do not give the uncertainty associated with this value.

The invention relates to an alternative method of constructing a fracture density log of a porous formation, from observations of the intersections of fracture traces on the walls of a borehole traversing the medium. The method overcomes the difficulties of the prior art by estimating, by means of an analytical formula, a conditional probability law of the three-dimensional fracture density, knowing the number of intersections.

SUMMARY OF THE INVENTION

The invention is a method of constructing a fracture density log of a porous formation traversed by a series of fractures and at least one borehole. The method comprises the following:
} a) measuring a number N of intersections between fractures and said borehole over a section of the borehole of length L located at a depth d, from observations of the wall of said section;

b) expressing a conditional probability law of the three-dimensional fracture density knowing the number N of intersections, the three-dimensional fracture density corresponding to a sum of fracture surface areas per volume unit;

c) determining with a computer a three-dimensional fracture density value at depth d calculated from the expression of the conditional probability law; and d) constructing a three-dimensional fracture density log by repeating a), b) and c) for different depths.

According to the invention, it is advantageously possible to associate with the three-dimensional fracture density log at least one three-dimensional fracture density uncertainty log by calculating quantiles of the conditional probability law.

In order to express the conditional probability law, it can be assumed that the fractures have barycenters distributed in the formation according to a Poisson's law. The conditional probability law can then be expressed according to the following parameters: a probability law of an angle defined between a fracture and the borehole, the number N of intersections and length L of the section.

Furthermore, it can be considered that the borehole has a negligible cross section in comparison with the extension of the fractures, and then the conditional probability law is estimated by a Gamma law of parameters N+1 and $\kappa_o L$, with $\kappa_o$ being the mean of the angle calculated from the probability law of the angle.

According to another embodiment, it can be considered that the fractures have an elliptic shape. It is then possible to define a fracture length probability law and a fracture width probability law, and then expressing the conditional probability function by accounting for the fracture length and width probability laws and by considering that the borehole section being considered is cylindrical.

The number N of intersections can then be replaced by a number of partial intersections corresponding to the fractures that do not completely intersect the borehole cross section.

The invention also relates to a method of optimizing the development of an underground formation traversed by a series of fractures and at least one borehole, comprising:

constructing a three-dimensional fracture density log and at least one three-dimensional fracture density uncertainty log;

constructing a three-dimensional fracture density map and a map of the uncertainties on fracture density values, from at least one of the logs; and optimizing the development of the underground formation by taking account of the density maps and of the uncertainties to extract flows between the fractures.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

The invention is a method of constructing a fracture density log of a porous formation traversed by a series of fractures. According to the invention, the three-dimensional fracture density in a fractured rock medium is estimated from measurements performed within a borehole traversing the formation.

Figure 1:
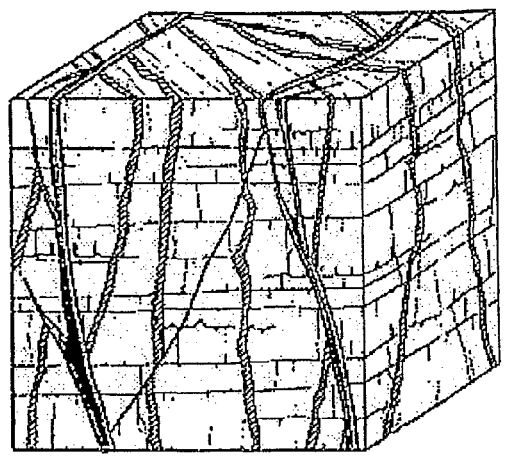
FIG. 1 illustrates a fractured porous medium.
Figure 2:
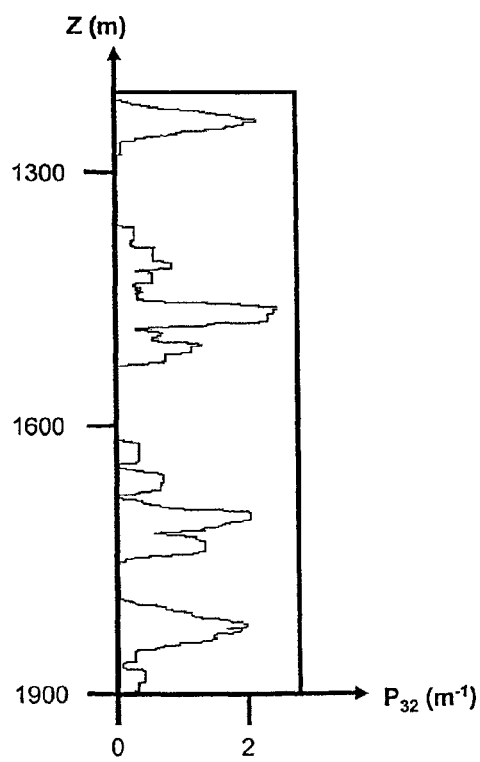
FIG. 2 shows a three-dimensional fracture density log.

What is referred to as log is a recording, in the form of a curve, of a property of a formation as a function of the drilling depth. FIG. 2 illustrates a three-dimensional fracture density log($P_{32}$) as a function of depth Z within a borehole traversing an underground formation.

What is referred to as borehole is a hole drilled in the formation in order to locate the geological conditions of the formation. It can be a well or a gallery for example.

What is referred to as fracture is a plane discontinuity of very small thickness in comparison with its extension, which represents a rupture plane of a rock of a porous formation.

There are two types of fracture density. One, denoted by $P_{10}$, corresponds to the lineic fracture density. It measures the number of fractures observed per length unit of a well or a gallery. It is calculated from a visual core analysis or by imaging from logs referred to as fracture logs, such as electrical resistivity logs (FMI/FMS) or acoustic logs (UBI). These techniques allow determination, over a portion L of the well, also referred to as sampling length, of a number N of fracture traces. Thus:

$$P_{10} = \frac{N}{L}$$

The second density, denoted by $P_{32}$, corresponds to the three-dimensional fracture density. It corresponds to the sum of the surface areas of the fractures per volume unit:

$$P_{32} = S(m^2)/m^3$$

There is no simple method for determining this ratio by simple observation.

The invention allows estimation of this three-dimensional fracture density in a fractured rock medium from measurements performed within a borehole in the medium. It furthermore allows obtaining uncertainties on this estimation.

Figure 3:
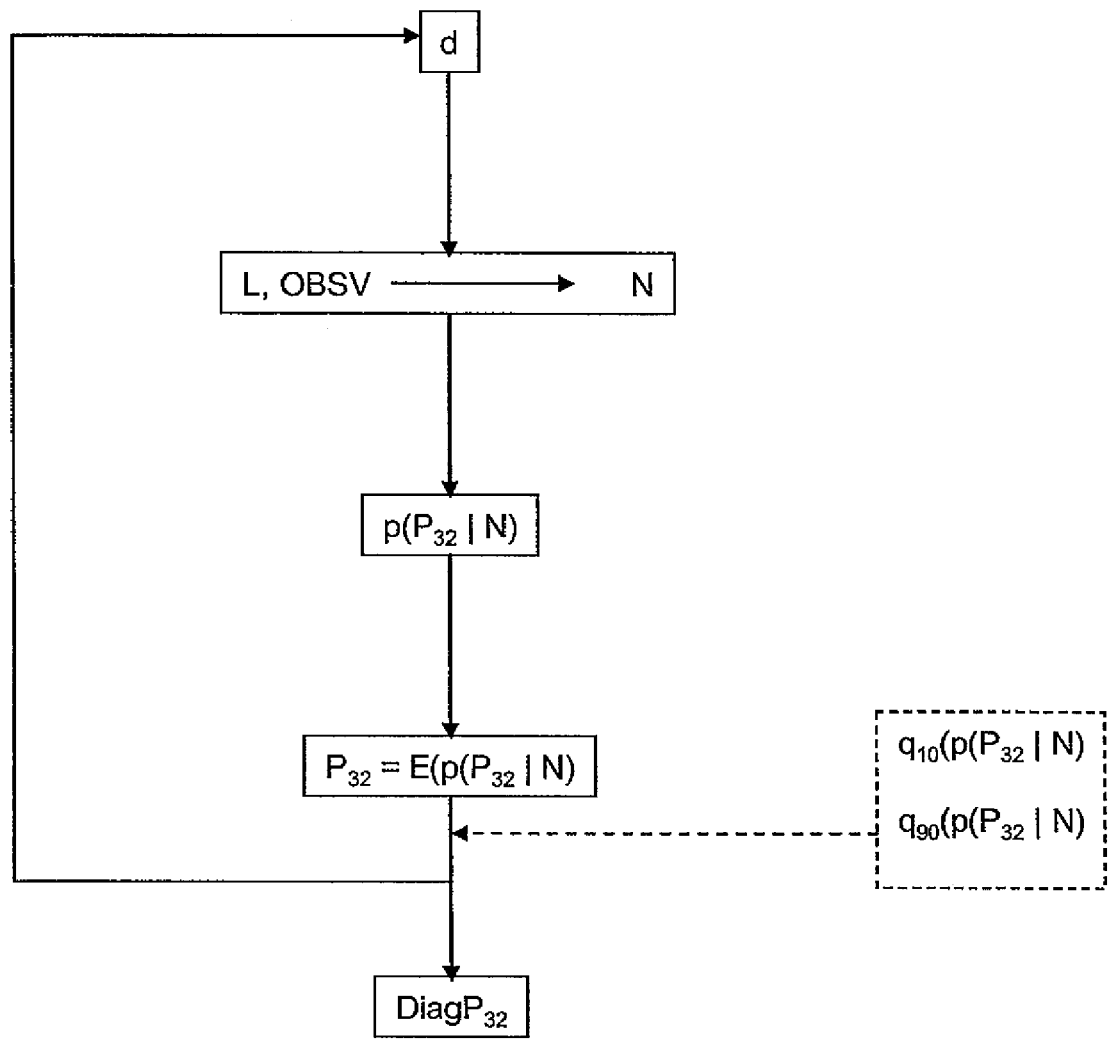
FIG. 3 diagrammatically shows the stages of the method according to the invention.

FIG. 3 illustrates the various stages of the method according to the invention. It comprises the following stages:

a) measuring a number N of intersections between fractures and a borehole over a section of the borehole of length L located at a depth d, from observations of a wall of the section at depth d, b) expressing a conditional probability law of the three-dimensional fracture density knowing the number N of intersections;

c) determining a three-dimensional fracture density value by calculating a mean of the conditional probability law;

d) constructing a three-dimensional fracture density log by repeating a), b) and c).

The method presented here relates to all samplings of media fractured by boreholes (wells, tunnels, galleries, etc.). It can therefore be used in the petroleum field, which is taken as an example in the description hereafter with reference to well data, and in civil engineering.

1—Measurement of Density $P_{10}$

The number N of intersections between fractures and the borehole over the section of length L is measured by observing the fracture traces on the borehole walls, at the level of this section.

The fracture traces can therefore be directly observed on the wall. This is notably the case within the context of a gallery, where the inside of the borehole can be easily observed.

It is also possible to core the formation while drilling, and then to observe the fracture traces on the outer surfaces of the core samples. This is notably the case within the context of well drilling. In fact, the outer surfaces of the cores represent an equivalent of the inner wall of the borehole. They are its counterpart.

Figure 4:
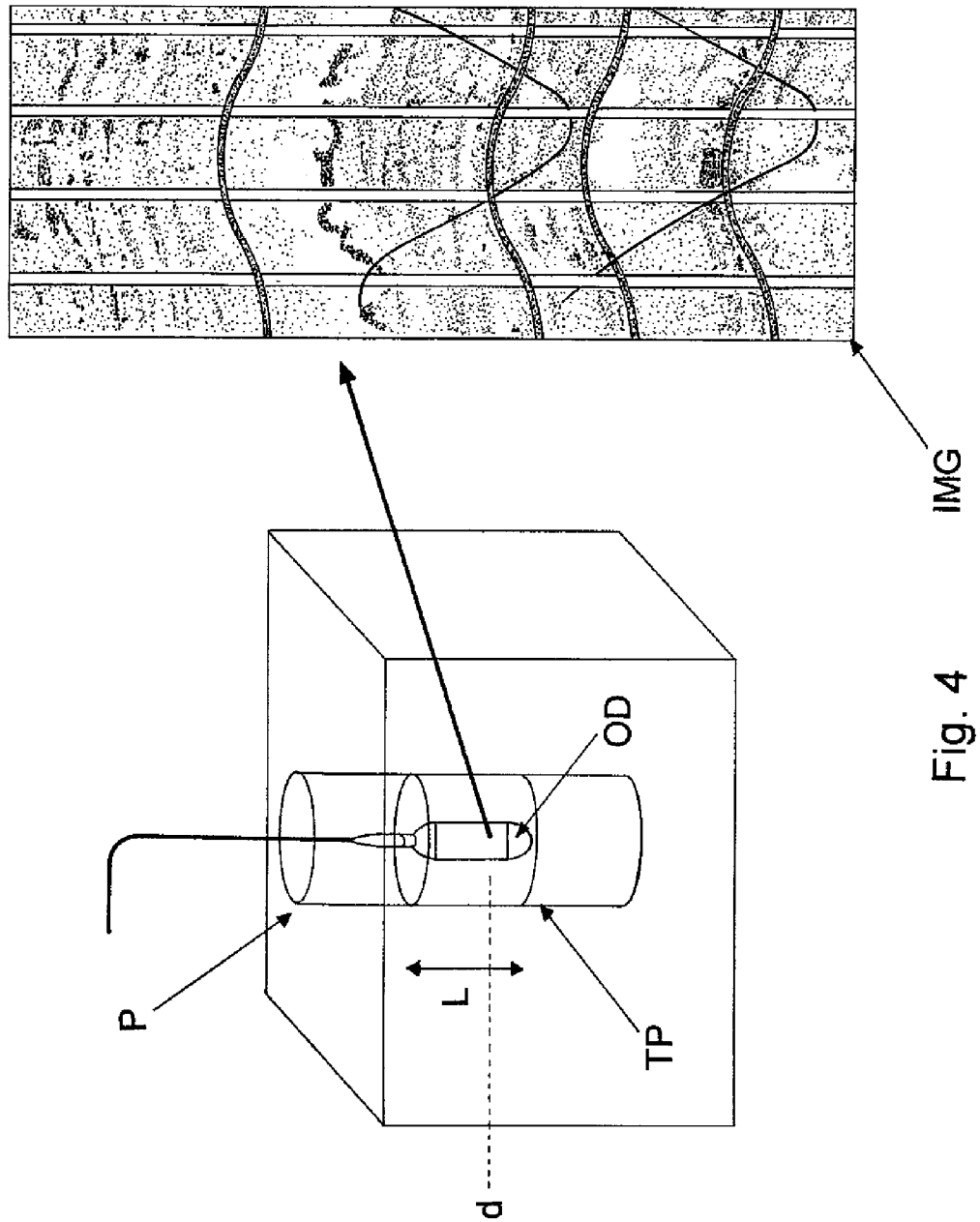
FIG. 4 shows the acquisition of an image of the wall of a borehole by means of a fracture logging tool.

Finally, as illustrated in FIG. 4, a logging tool (OD) can also be fed at a depth d into borehole P (narrow gallery or well), so as to construct an image (IMG) of the wall of the section of length L of the borehole at depth d. This type of logs, referred to as fracture logs, conventionally corresponds to electrical resistivity logs (FMI/FMS) or to acoustic logs (UBI). Finally, an analysis of the image thus produced allows determination N, over a length L, and at depth d.

2—Expression of the Conditional Probability Law: $p(P_{32}|N)$

During this stage, a conditional probability law of the three-dimensional fracture density is estimated knowing the number N of intersections over a borehole section of length L.

A probability law or distribution describes the typical distributions of values that occur with a random phenomenon. The distribution function or the density (probability density) can be used to describe such a law.

The following method can be applied to provide an analytical formulation of the conditional probability law.

According to the general assumptions, the fractures are considered to be plane and their barycenters are distributed according to a Poisson process.

Figure 5:
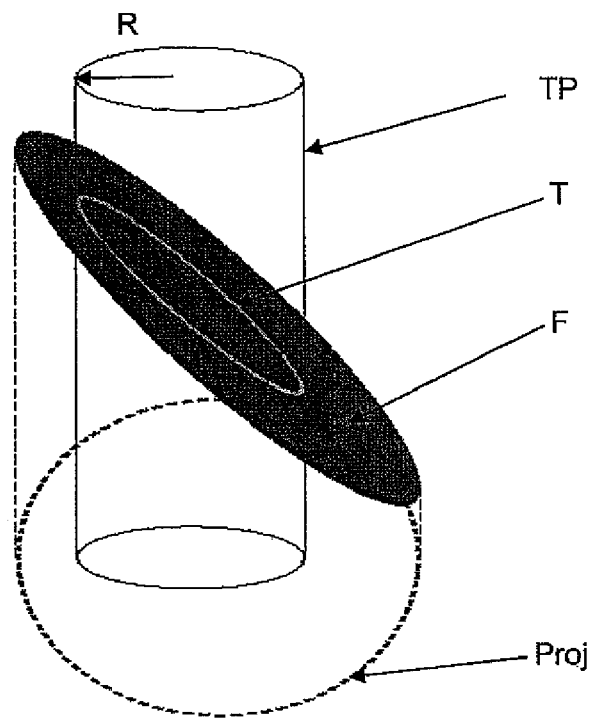
FIG. 5 is a diagram of a full trace.

According to an embodiment, the size of the fractures is considered to be very large in relation to the size of the opening, or cross section, of the borehole. This condition is assumed to be met when the intersections between fractures and borehole only correspond, at the borehole scale, to full traces. What is referred to as full trace is a fracture trace that goes right round the borehole, as illustrated in FIG. 5, which shows the borehole section (TP), the fracture (F) and the trace (T). This hypothesis implies that the borehole section can be considered to be a segment.

The conditional probability law can then be expressed as a function of the following parameters:

length L of the borehole section being studied;

number N of traces observed; and probability law of an angle is defined between a fracture and the borehole. The angle θ, between 0° and 90°, formed by the direction normal to the fracture plane and the direction of the borehole, can be considered for example. This angular probability law is not explicitly given: it can be a priori any law. Similarly, the geometrical shape of the fractures is not specified.

It can then be shown that the conditional probability law of the three-dimensional fracture density knowing the number N of intersections, denoted by $p(P_{32}|N)$, is a Gamma law of parameters N+1 and $\kappa_o L$:

$$p(P_{32}/N) = e^{-P_{32}\kappa_o L} \frac{P_{32}^N (\kappa_o L)^{N+1}}{N!} = \Gamma_{N+1, \kappa_o L}(P_{32})$$

with: $\kappa_o = E(\cos\theta)$.

Most of the time, this quantity $\kappa_o$ is accessible only numerically. It is thus obtained by numerical integration using known conventional methods (Gaussian quadrature, trapezium rule, Simpson's method, etc.).

3—Construction of a Three-Dimensional Fracture Density log $P_{32}$

A three-dimensional fracture density value at depth d is determined from this conditional probability law $p(P_{32}|N)$, estimated at depth d.

The expression of the conditional probability law is therefore calculated:

$$E(P_{32}/N) = \frac{N+1}{\kappa_o L}$$

Repeating stages 1 and 3 described above for other depths allows obtaining a set of three-dimensional density/depth pairs. These pairs allow construction of a curve referred to as three-dimensional fracture density log. Such a log is shown in FIG. 2.

According to an embodiment, knowing the complete distribution of the three-dimensional fracture density $p(P_{32}|N)$, it is also possible to determine the mode and the standard deviation of this fracture density:

$$\text{Mode}(P_{32}/N) = \frac{N}{\kappa_o L}$$

$$\sqrt{\text{Var}(P_{32}/N)} = \frac{\sqrt{N+1}}{\kappa_o L}$$

The distribution function of this conditional probability law can also be calculated. The value thereof is:

$$F(P_{32}/N) = \frac{\gamma(N+1, P_{32}\kappa_o L)}{N!}$$

with

-continued
$$\gamma(a, x) = \int_{t=0}^{x} e^{-t} t^{a-1} dt$$

where γ is the incomplete Gamma function tabulations of which can be found in scientific calculation libraries.

Finally, it is also possible to calculate the normalized quantiles of this conditional probability law, that is scalars $q_\alpha$ such that:

$$F\left(\frac{q_\alpha}{\kappa_o L} \middle/ N\right) = P\left(P_{32} \le \frac{q_\alpha}{\kappa_o L} \middle/ N\right) = \alpha(\%)$$

These scalars can be obtained by solving $$\frac{\gamma(N+1, q_\alpha)}{N!} = \alpha(\%).$$

This solution can be carried out using a Newton-Raphson algorithm, a dichotomy or tabulations existing in some libraries.

An uncertainty on the density value can then be associated with the three-dimensional fracture density log by associating with each density value one or more values characteristic of the distribution, such as quantiles $q_{10}$ and $q_{90}$.

Variants

According to a particular embodiment, the fact that all the intersections between fractures and borehole do not correspond, at the scale of the borehole, to full traces is taken into account.

A ratio Pf between the number of full traces and all of the traces observed is then calculated. This ratio thus ranges between 0 and 1.

Pf=1

If this ratio is substantially equal to 1, the method described above can be used to estimate the conditional probability law $p(P_{32}|N)$.

0.9≤Pf<1

If this ratio is greater than or equal to 0.9 while being different from 1, the method described above can be used to express the conditional probability law $p(P_{32}|N)$. A correction linked to the fact that Pf≠1 can however be added. This correction consists in replacing number N by the number of full traces only. Factor $\kappa_o$ is then corrected by replacing it by factor $\kappa_f$ thus defined:

$$\kappa_f = \kappa_0 \cdot \frac{1}{2}(1 + Pf)$$

Pf<0.9

Figure 6:
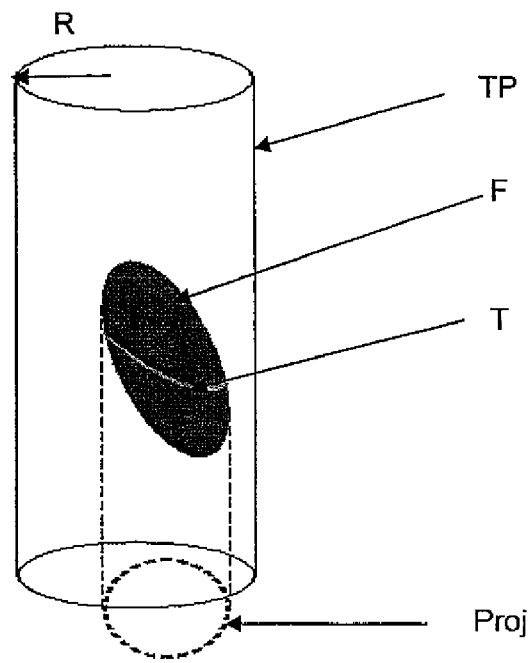
FIG. 6 is a diagram of a partial trace.
Figure 7:
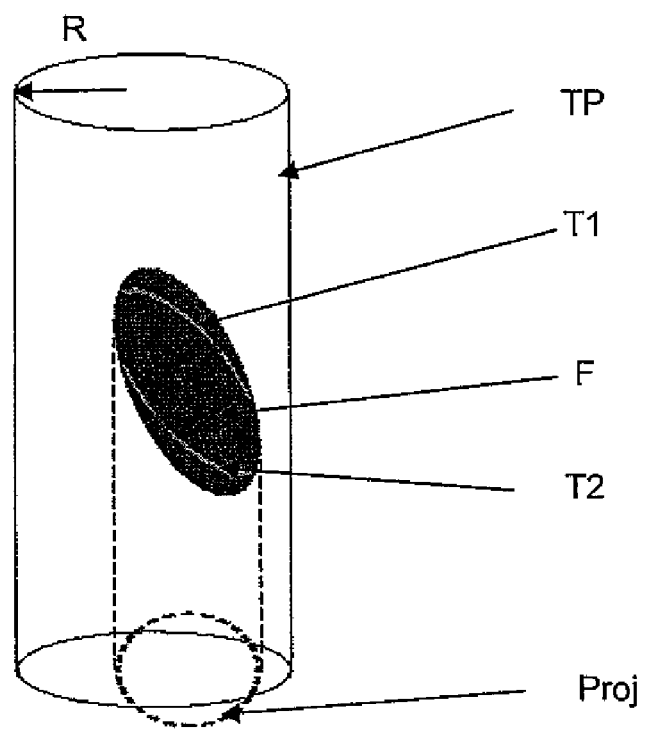
FIG. 7 is a diagram of a double trace with the intersection of the fracture and of the well wall corresponds to two non-connected arcs.

If this ratio is below 0.9, the following method wherein the two hypotheses as follows are considered can be used:
  i. The fractures have an elliptical shape (FIGS. 5, 6 and 7).
  ii. The borehole section considered is cylindrical, of radius R (FIGS. 5, 6 and 7).

The borehole is considered as a cylindrical object and no longer as a segment. The radius of the borehole is not negligible with respect to the size of the fractures. Furthermore, the traces (T) of fractures (F) on the borehole can be, according to circumstances, full (FIG. 5), partial (FIG. 6) or double (FIG. 7). The input data required for expression of the conditional probability law are:

Length L of the borehole section studied;

The number N of traces observed. Depending on the data available, it is possible to consider carrying out the following procedure by counting all the traces, whether full or partial, or by counting only the full traces. The first option has the advantage of giving access to a larger sampling whereas the second allows the analysis of the borehole wall observations to be simplified;

Radius R of the cross section of the borehole is assumed to be circular;

The probability law describing the orientation of the fractures assumed to be plane and elliptical. This law thus relates to a trihedron in space (or three Euler angles): the first vector designating the normal to the fracture and the other two specifying the orientation of the major axis and of the minor axis in the fracture plane (a law concerning only the normal, such as a bivariate normal law, or a Kent law and deterministic hypotheses on the orientation in the plane can be used), A probability law of the size of the fractures assumed to be plane and elliptical, is a law concerning the (minor radius, major radius) pair of the ellipse.

In order to determine the conditional probability law, the following is then carried out:

i) Calculation of the Mean Surface Area of the Fractures E(S)

It can be here a readily accessible quantity depending on the law selected for the pair of radii of the ellipse (if, for example, a constant ratio is chosen between the two radii and if the major radius law allows an analytical calculation of the $2^{nd}$ order moment, that is the expression of the square of the radius). If an analytical solution is not available, it is possible to use a numerical integration (Gaussian quadrature, trapezium rule, Simpson's method, etc.).

iI) Calculation of the Radii of the Projection of an Ellipse (Denoted by Proj in FIGS. 5, 6 and 7) on the Plane Orthogonal to the Borehole Axis This stage analytically calculates the projection of an ellipse defined by its orientation trihedron and its two radii on the plane orthogonal to the borehole axis. The advantage of this calculation is to determine the radii of the ellipse projected as a function of the radii and of the Euler angles of the initial ellipse.

iii) Calculation of the Useful Surface Areas Expressions

The ellipse is considered to be projected onto the plane orthogonal to the borehole axis defined in the previous stage and the circular section of the borehole on this plane. The following is defined:

σf equals the surface area of the domain to which the center of the ellipse must belong so that it intersects the circle with a full trace;

σ equals the surface area of the domain to which the center of the ellipse must belong so that it intersects the circle;

σ2 equals the surface area of the domain to which the center of the ellipse belongs so that it intersects the circle with two distinct traces (T1 and T2, FIG. 7). According to the radii of the ellipse and of the circle, this surface area can possibly be zero, σ1 equals σ−σ2 which is the surface area of the domain to which the center of the ellipse belongs so that it intersects the circle with a single trace.

It is shown, using differential geometry reasoning, that the relations connecting these surface areas to the radii of the projected ellipse are expressed in form of analytical functions and of elliptical integrals tabulated in scientific libraries.

Thus, by combining these calculations and those of the previous stage, the dependence of these surface areas with the radii and the Euler angles of the initial ellipse in $R^3$ is found. It is then possible by numerical integration to calculate the expressions of these surface areas when the ellipse modelling the fracture follows the statistical orientation and length laws initially defined by the user.

iv) Calculation of the Useful Ratios

The previous stages allow calculation of the following ratios:

$\kappa_f[=]$ equals $E(\sigma f)/E(S)$ which is used if the only traces counted are the full traces;

$\kappa[=]$ equals $E(\sigma)/E(S)$ which is used if the traces counted include partial traces; and $\kappa[=]E(\sigma)/E(S)$ which is the probability for a fracture intersecting the borehole of intersecting it with two distinct traces.

v) Expression for the Conditional Probability Law $p(P_{32}|N)$

Several scenarios arise depending on the nature of the traces taken into account (partial or full).

In the case of full traces, the expressions to be used are absolutely identical to those mentioned above, however by replacing $\kappa_o$ by $\kappa_f$.

In the case of full and partial traces, using the same expressions with $\kappa$ instead of $\kappa_o$ amounts to counting the fractures (and not the traces). Now, it is not possible, upon observation, to distinguish the doubles traces from the simple traces and therefore to find the number of fractures intersecting the well. Thus, the previous calculation replacing $\kappa_o$ by $\kappa$ is valid only when the double trace occurrence probability is negligible and therefore when the number of traces is in bijection with the number of fractures intersecting the well. When "r" is not zero, it can be shown that the following expressions have to be used:

$$p(P_{32}/N) = \frac{1+r}{1-(-r)^{N+1}} \sum_{i=0}^{\lfloor N/2 \rfloor} B_{r,N-i}(i)\Gamma_{N-i+1,\kappa L}(P_{32})$$

with $$B_{r,n}(k) = C_n^k r^k (1-r)^{n-k} \text{ and } \Gamma_{n,\lambda}(p) = \frac{e^{-\lambda p} \lambda^n p^{n-1}}{(n-1)!}$$

A three-dimensional fracture density value at depth d is determined from this conditional probability law $p(P_{32}|N)$ estimated at depth d. Therefore, the expression of this conditional probability law is calculated:

$$E(P_{32}/N) = \frac{N+1-f(N,r)}{\kappa L} \text{ and}$$

$$\sqrt{\text{Var}(P_{32}/N)} = \frac{\sqrt{N+1-f(N,r)}}{\kappa L}$$

with: $f(N,r) = \frac{r[N(1+r)(1+(-r)^N) - (1-r)(1-(-r)^N)]}{(1+r)^2(1-(-r)^{N+1})}$ It is also possible to associate an uncertainty with the density log by calculating the distribution function and the quantiles. For the cases relative to the correction due to double traces ($r \neq 0$), the distribution function is formulated as follows:

$$F(P_{32}/N) = \frac{1+r}{1-(-r)^{N+1}} \sum_{i=0}^{\lfloor N/2 \rfloor} \frac{B_{r,N-i}(i)}{(N-i)!} \gamma(N-i+1, P_{32}\kappa L)$$

The normalized quantiles $q_\alpha$ can be calculated for example by means of a Newton-Raphson method, noting however that the derivative of $F(P_{32}|N)$ is but law $p(P_{32}|N)$.

Finally, according to another embodiment, it is possible to work by fracture families classified according to their direction.

EXAMPLE

The Borehole Radius is not Negligible with Respect to the Size of the Fractures

Within the context of this example, the goal is to compare the estimated conditional probability law $p(P_{32}|N)$ with a large number of samplings of discrete elliptical fracture networks whose orientation and length laws are such that the probability of having double traces is not equal to zero. The numerical data and hypotheses selected are as follows:

2000 generated networks;
L=20 m;
R=0.1 m;

The major radius of the elliptical fractures follow a lognormal law of mean 1 m and of standard deviation 0.1 m, and the aspect ratio (ratio of the minor radius to the major radius) is constant and equal to 0.3;

the orientation law of the normal is of bivariate normal type ("Marcotte H. and Henry E. Automatic Joint Set Clustering Using a Mixture of Bivariate Normal Distributions. Int. J. Rock Mech. Min. Sc., 39: 323-334, 2002") with a mean pole inclined at 80° to the direction of the well, and identical standard deviations of 0.1 (isotropic dispersion around the mean pole); and the major axis of the ellipse belongs to the plane orthogonal to the well.

The numerical calculations then give $\kappa$=0.174 and r=34.4%.

Figure 8:
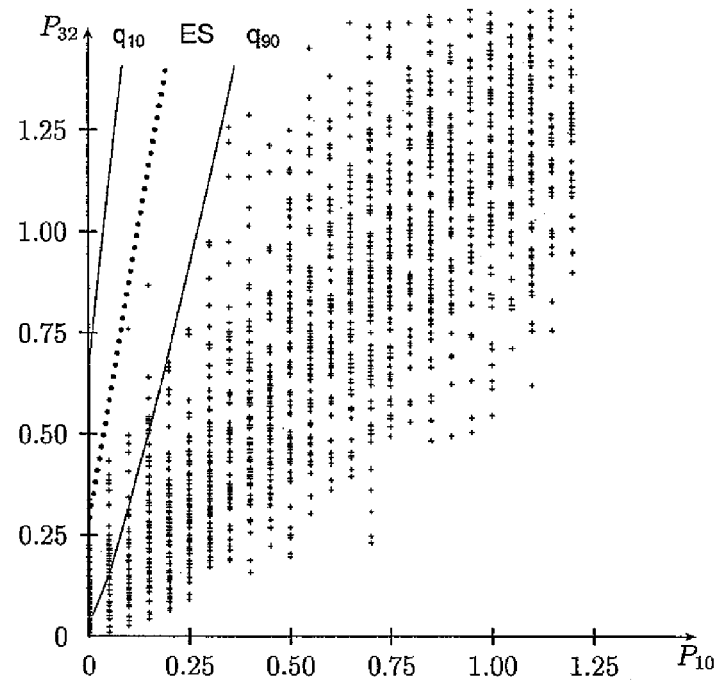
FIG. 8 shows density $P_{32}$, expectation (ES) and the 10% ($q_{10}$) and 90% ($q_{90}$) deciles of density $P_{32}$ as a function of density $P_{10}$, with the assumption that the fractures are very large in relation to the well radius, with the radius being then considered to be a 1D line.
Figure 9:
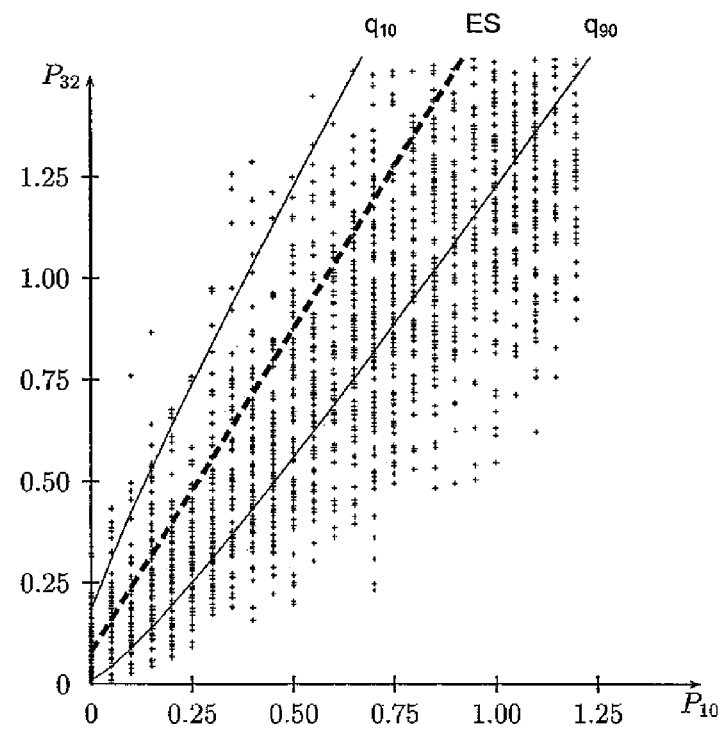
FIG. 9 shows density $P_{32}$, expectation (ES) and the 10% ($q_{10}$) and 90% ($q_{90}$) deciles of density $P_{32}$ as a function of density $P_{10}$, using a formula that accounts for the fracture length distribution and therefore of the presence of partial traces. With the probability of having double traces being disregarded, which covers the traces to be assumed to come from fractures that are all different.
Figure 10:
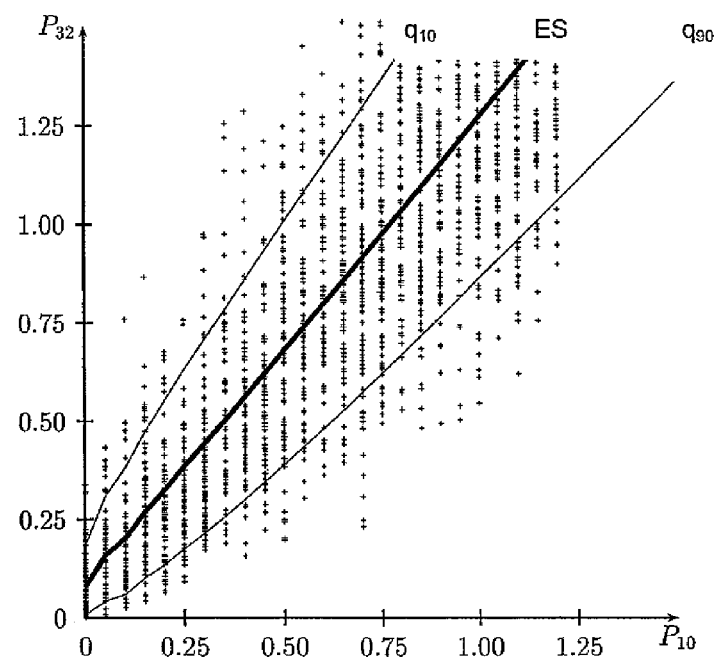
FIG. 10 shows density $P_{32}$, expectation (ES) and the 10% ($q_{10}$) and 90% ($q_{90}$) deciles of density $P_{32}$ as a function of density $P_{10}$, using a formula that accounts for the fracture length distribution and of the probability of presence of double traces.

FIGS. 8, 9 and 10 represent density $P_{32}$ as a function of density $P_{10}$, density values $P_{32}$ being obtained from calculations on the stochastic discrete fracture networks. These figures also show the expectation (ES) and the 10% ($q_{10}$) and 90% ($q_{90}$) deciles of density $P_{32}$ as a function of density $P_{10}$. These figures respectively correspond to the following hypotheses:

1. FIG. 8: The theoretical developments relative to very large fractures with respect to the size of the well being used. It can be noted that the theoretical results widely overestimate density $P_{32}$ because they are based on a hypothesis according to which all the traces are full, which is not the case in the example selected.

2. FIG. 9: The theoretical results for calculating the expectation and the quantiles of $P_{32}$ taking account of a correction due to the partial traces, but while disregarding the double traces. An overestimation of $P_{32}$ is then always noted because, assuming that each trace comes from a different fracture, the number of fractures is wrongly increased.

Figure 11:
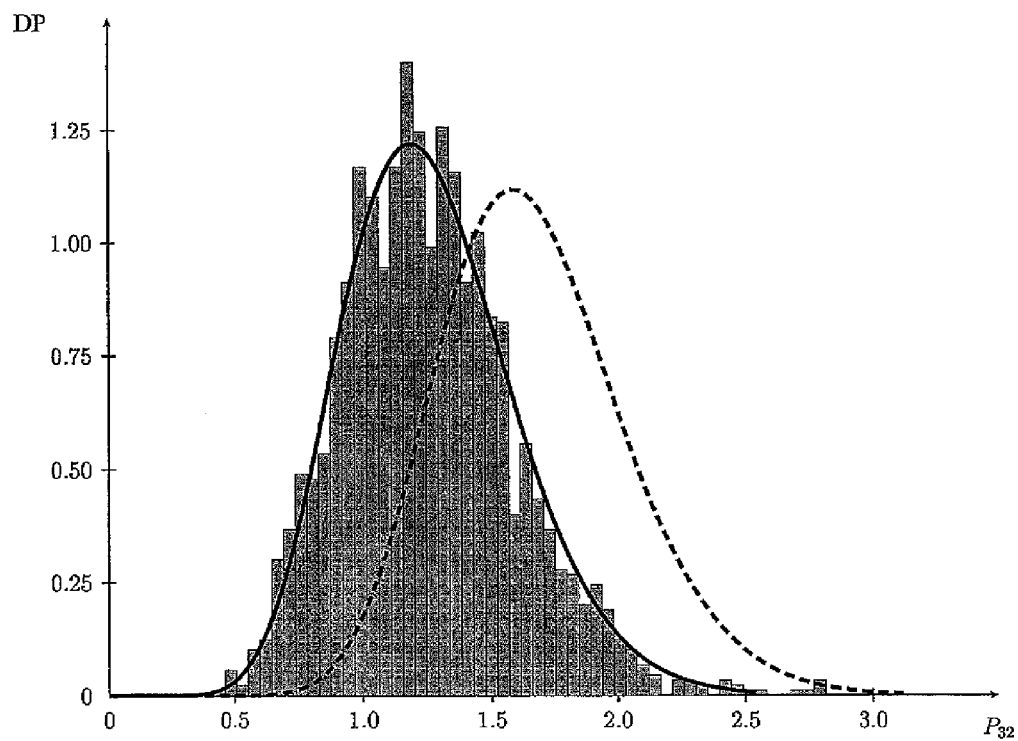
FIG. 11 illustrates the probability law for density $P_{32}$ without accounting for the double traces (in dotted line) and with the correction due to the double traces (full line), as well as the histogram of the values of $P_{32}$ obtained from samplings of discrete fracture networks corresponding to a given value of $P_{10}$.

3. FIG. 10: The expressions used for the expectation and the quantiles of $P_{32}$ are those correcting the effects of partial traces but also of double traces. A good match is then observed between the confidence interval and the cluster of points. In particular it is checked if the number of points located within the interval is close to 80%. Besides, for a given value of $P_{10}$, the normalized histogram of the realizations of $P_{32}$ in FIG. 11 is compared with the calculated probability laws of $P_{32}$, first by disregarding the double traces, the second by not disregarding them, but by taking into account the partial traces in both cases. A good match is then noted between the numerical realizations and the theoretical curve correcting the double trace effects. FIG. 11 illustrates the probability law of density $P_{32}$ without taking into account the double traces (in dotted line) and with the correction due to the double traces (in full line), as well as the histogram of the values of $P_{32}$ obtained from samplings of discrete fracture networks corresponding to a given value of $P_{10}$. The ordinate of FIG. 11 is the probability density (DP).

Application

The method according to the invention can be used to optimize the development of an underground formation traversed by a series of fractures and at least one borehole.

It can be a petroleum reservoir, an acid gas storage site or a formation concerned by civil engineering operations.

The following method can thus be used:

Constructing a three-dimensional fracture density log with which a density uncertainty log is associated. The method according to the invention is then used;

Constructing a three-dimensional fracture density map and an uncertainty map for fracture density values by means of a geostatistical method. The goal is to establish a correlation between the density map and explicative parameter maps (fault distance, curvatures, etc.) conditioned to well ("Garcia M., Gouth F. and Gosselin O. Fast and Efficient Modeling and Conditioning of Naturally Fractured Reservoir Models Using Static and Dynamic Data. SPE Europec/EAGE Conference and Exhibition, Paper 107525. London 2007");

From the density map and the uncertainty map, and from the other parameters relative to the fracture network (orientation, length, opening, conductivity), estimating the hydraulic properties at any point of the fractured medium using either analytical estimation methods, or by explicitly generating a discrete fracture network and by calculating the flows between fractures; and These hydraulic properties are then used in a flow simulator at the reservoir scale or in the vicinity of a well, which provides guidance for the selection of borehole sites in order to optimize the development of the underground formation.

Advantage of the Method

The computer implemented method according to the invention saves considerable time in relation to the search for a mean density from discrete fracture network samplings according to a Monte Carlo method. It is based on an analytical expression for the conditional probability law of the three-dimensional fracture density and for the corresponding distribution function, knowing the number of traces observed over a study interval of given length.

This conditional probability law depends on correction factors for the biases generated by the orientation, the fracture length and the possible double traces. On the one hand, the mean and the standard deviation of the density are readily deduced from the probability law and, on the other hand, the distribution function allows to extract the quantiles (10% and 90% quantiles for example) measuring the uncertainty on the density value. Thus, in addition to an estimation of the mean fracture density, the method according to the invention allows to provide an uncertainty according to the number of fracture traces observed over a cylinder interval (well or gallery) and on the length of this interval.

The invention claimed is:

1. A computer implemented method of developing an underground formation including constructing a fracture density log of the underground formation traversed by a series of fractures and at least one borehole, comprising:

a) measuring a number of intersections between fractures and the at least one borehole over a section of the at least one borehole of a length located at a depth from observations of a wall of the section;

b) expressing a conditional probability law of a three-dimensional fracture density with knowledge of the number of intersections and the three-dimensional fracture density corresponding to a sum of fracture surface areas per volume unit;

c) determining with a computer a three-dimensional fracture density value at the depth calculated from the expression of the conditional probability law;

d) constructing a three-dimensional fracture density log by repeating a), b) and c) for different depths;

e) constructing a three-dimensional fracture density log and at least one three-dimensional fracture density uncertainty log;

f) constructing a three-dimensional fracture density map and a map of uncertainties of fracture density values from at least one of the logs; and g) optimizing with a computer development of the underground formation by accounting for the density map and the map of the uncertainties to extract flows between the fractures; and wherein at least one three-dimensional fracture density uncertainty log is associated with the three-dimensional fracture density log by calculating quantiles of the conditional probability law.

2. A method as claimed in claim 1, wherein the conditional probability law is expressed by considering the fractures to have barycenters distributed in the formation according to Poisson's law.

3. A method as claimed in claim 2, wherein the conditional probability law is expressed as a function of a probability law of an angle defined between a fracture and the at least one borehole, the number of intersections and the length of the section.

4. A method as claimed in claim 3, wherein:
   the fractures have an elliptical shape and the borehole section is cylindrical and further comprising:
   defining a fracture length probability law and a fracture width probability law; and
   estimating a conditional probability function by accounting for the fracture length and width probability laws.

5. A method as claimed in claim 2, wherein the at least one borehole has a smaller cross section in comparison with an extension of the fractures.

6. A method as claimed in claim 5, wherein the conditional probability law is expressed with a Gamma law of parameters $N+1$ and $k_o L$, with $k_o$ being a mean of the angle calculated from the probability law of the angle wherein N is the number of intersections and L is the length of the section.

7. A method as claimed in claim 6, wherein
   the fractures have an elliptical shape and the borehole section is cylindrical and further comprising:
   defining a fracture length probability law and a fracture width probability law; and
   estimating a conditional probability function by accounting for the fracture length and width probability laws.

8. A method as claimed in claim 5, wherein:
   the fractures have an elliptical shape and the borehole section is cylindrical and further comprising:
   defining a fracture length probability law and a fracture width probability law; and estimating a conditional probability function by accounting for the fracture length and width probability laws.

9. A method as claimed in claim 2, wherein:
the fractures have an elliptical shape and the borehole section is cylindrical and further comprising:
defining a fracture length probability law and a fracture width probability law; and
estimating a conditional probability function by accounting for the fracture length and width probability laws.

10. A method as claimed in claim 1, wherein the conditional probability law is expressed as a function of a probability law of an angle defined between a fracture and the at least one borehole, the number of intersections and the length of the section.

11. A method as claimed in claim 10, wherein the at least one borehole has a smaller cross section in comparison with an extension of the fractures.

12. A method as claimed in claim 11, wherein the conditional probability law is expressed with a Gamma law of parameters N+1 and $k_oL$, with $k_o$ being a mean of the angle calculated from the probability law of the angle wherein N is the number of intersections and L is the length of the section.

13. A method as claimed in claim 12, wherein:
the fractures have an elliptical shape and the borehole section is cylindrical and further comprising:
defining a fracture length probability law and a fracture width probability law; and
estimating a conditional probability function by accounting for the fracture length and width probability laws.

14. A method as claimed in claim 11, wherein:
the fractures have an elliptical shape and the borehole section is cylindrical and further comprising:
defining a fracture length probability law and a fracture width probability law; and
estimating a conditional probability function by accounting for the fracture length and width probability laws.

15. A method as claimed in claim 10, wherein:
the fractures have an elliptical shape and the borehole section is cylindrical and further comprising:
defining a fracture length probability law and a fracture width probability law; and
estimating a conditional probability function by accounting for the fracture length and width probability laws.

16. A method as claimed in claim 1, wherein the at least one borehole has a smaller cross section in comparison with an extension of the fractures.

17. A method as claimed in claim 16, wherein the conditional probability law is expressed with a Gamma law of parameters N+1 and $k_oL$, with $k_o$ being a mean of the angle calculated from the probability law of the angle wherein N is the number of intersections and L is the length of the section.

18. A method as claimed in claim 17, wherein:
the fractures have an elliptical shape and the borehole section is cylindrical and further comprising:
defining a fracture length probability law and a fracture width probability law; and
estimating a conditional probability function by accounting for the fracture length and width probability laws.

19. A method as claimed in claim 16, wherein:
the fractures have an elliptical shape and the borehole section is cylindrical and further comprising:
defining a fracture length probability law and a fracture width probability law; and
estimating a conditional probability function by accounting for the fracture length and width probability laws.

20. A method as claimed in claim 1, wherein:
the fractures have an elliptical shape and the borehole section is cylindrical and further comprising:
defining a fracture length probability law and a fracture width probability law; and
estimating a conditional probability function by accounting for the fracture length and width probability laws.

21. A method as claimed in claim 20, wherein the number of intersections is replaced by a number of partial intersections corresponding to fractures that do not completely intersect a cross section of the borehole.

* * * * *